(12) United States Patent
Meoli et al.

(10) Patent No.: US 9,654,332 B1
(45) Date of Patent: May 16, 2017

(54) METHODS AND SYSTEMS FOR SHARING INSURANCE INFORMATION THROUGH MOBILE APPLICATIONS

(75) Inventors: Peter Meoli, Elkridge, MD (US); Matthew Slocum, North Bethesda, MD (US); Regina Bashkansky, Alexandria, VA (US)

(73) Assignee: Government Employees Insurance Company (GEICO), Chevy Chase, MD (US)

( * ) Notice: Subject to any disclaimer, the term of this patent is extended or adjusted under 35 U.S.C. 154(b) by 261 days.

(21) Appl. No.: 13/594,787

(22) Filed: Aug. 25, 2012

(51) Int. Cl.
*G06F 15/16* (2006.01)
*H04L 29/08* (2006.01)
*H04L 29/06* (2006.01)

(52) U.S. Cl.
CPC ........ *H04L 29/08072* (2013.01); *H04L 29/06* (2013.01)

(58) Field of Classification Search
USPC .................... 709/217; 707/609, 769; 455/418
See application file for complete search history.

(56) References Cited

U.S. PATENT DOCUMENTS

| 6,615,038 | B1 * | 9/2003 | Moles ..................... H04M 3/22 455/418 |
| 2003/0182232 | A1 | 9/2003 | Zeltzer et al. |
| 2007/0078784 | A1 | 4/2007 | Donovan et al. |
| 2008/0167025 | A1 * | 7/2008 | Williamson ............ H04W 4/02 455/418 |
| 2010/0100561 | A1 * | 4/2010 | Cooper ................ G06Q 10/067 707/769 |
| 2010/0174564 | A1 | 7/2010 | Stender et al. |
| 2010/0174750 | A1 * | 7/2010 | Donovan .............. G06F 19/322 707/781 |
| 2010/0223228 | A1 * | 9/2010 | Logan ............... G06F 17/30569 707/609 |
| 2011/0015946 | A1 * | 1/2011 | Buckowsky ........... G06Q 40/08 705/3 |

* cited by examiner

*Primary Examiner* — Tammy Nguyen
(74) *Attorney, Agent, or Firm* — Finnegan, Henderson, Farabow, Garrett & Dunner LLP (57) ABSTRACT

Methods and systems for sharing account information, such as insurance information, between a primary accountholder's mobile application and one or more secondary accountholder's mobile applications are disclosed. In one embodiment, a companion mobile application is disclosed that provides a secondary accountholder access to a subset of information relating to the primary accountholder's account. Updates to the primary accountholder are provided to the companion mobile application such that the secondary accountholders have access to current account information without having to provide credentials relating to the primary accountholder. In certain embodiments, updates to the account are transferred from a first mobile device including the primary mobile application to a second mobile device including the companion mobile application.

36 Claims, 9 Drawing Sheets

METHODS AND SYSTEMS FOR SHARING INSURANCE INFORMATION THROUGH MOBILE APPLICATIONS

TECHNICAL FIELD

The present disclosure relates to the field of exchanging account information between accountholders, and more particularly, to systems and methods for exchanging information between the mobile devices of accountholders.

BACKGROUND OF THE DISCLOSURE

Applications on mobile devices, such as the iPhone® or the iPad®, have fast become a growing trend in the smartphone and tablet markets. The development of mobile applications has drastically increased in recent years as more and more users of mobile devices gravitate towards the user-friendly functionality of a mobile application over the Internet browser. As a result, businesses having increasingly developed their own mobile applications to provide products and services, as well as advertising, financial services, education, technical information, and other forms of customer service.

Insurance companies are among those businesses developing mobile applications. Such mobile applications are available to primary policyholders for the company's insurance products and services. For example, GEICO® offers a mobile application, which allows primary policyholders access to certain features or services relating to their insurance policy. The features may include the ability to pay a bill, find discounts, view details about coverage, view driver and vehicle information, or update contact information. Other companies also offer mobile applications to their accountholders providing features such as banking or financial services, entertainment, shopping, education, etc. These mobile applications may also enable accountholders to pay a bill, find discounts, view details about their account, access account information, or update contact information. For example, a mobile application of a banking entity may allow an accountholder of the bank to view his bill, make payments, transfer money, or download statements. A mobile application of an entertainment service, such as Netflix®, may allow an accountholder to view movies on the mobile device.

Often times, however, an account, such as an insurance policy, covers multiple individuals. For example, a multiple-driver insurance policy may cover a family of drivers, and may include two parents and one or more children. In this case, one individual serves as the primary accountholder (or "policyholder") while the other drivers are secondary policyholders. In other situations, an account may cover a single individual, who shares certain features of the account with other individuals. For example, a checking account at a banking institution may cover a parent, and the parent may share a debit card with a child or spouse as an authorized user.

The primary accountholder may have access to the mobile application of the business, such as their insurance provider. In doing so, the primary accountholder normally logs into the mobile application using some form of login credentials. These credentials could include a password associated with a username, an email address, an account ID, or an account number. The secondary accountholders may also want access to the mobile application as well. However, the primary accountholder may not want to share his login credentials with the other accountholders for accessing and using the mobile application. For example, in the insurance context, a parent driver may not want to share his login credentials with his young, teenage drivers or with a spouse driver. Additionally, the primary accountholder may want to prevent any secondary accountholders from making changes to the account via the mobile application. As a result, the primary accountholder may want to limit access to certain features of the mobile application. For example, in the insurance context, the primary policyholder may want to be the only policyholder with the ability to modify the policy, make payments, and submit claims on a mobile application. However, the primary policyholder may want the secondary policyholders to have access to assistance features (e.g., roadside assistance) and education features on a mobile application.

Thus, there exists a need to provide a mobile application that allows secondary accountholders to have efficient and user friendly access to primary accountholder information while maintaining control of the accountholder information.

SUMMARY

In accordance with an embodiment, a mobile device for providing a companion mobile application for accessing information relating to a primary insurance policy of a primary policyholder may be provided. The mobile device may include a memory storing a companion mobile application associated with a secondary policyholder of the primary insurance policy. The mobile device may also include a processor configured to receive a request to launch the companion mobile application and execute the companion mobile application. In certain embodiments, the companion mobile application provides access to a subset of primary insurance policy information that is accessible by the primary policyholder through a primary mobile application included in a remote mobile device of the primary policyholder.

In another embodiment, a system for providing mobile applications relating to insurance policies may be provided. The system may include a memory device including program instructions and one or more processors configured to execute the program instructions. The processor may execute instructions to provide a primary mobile application for storage in a first mobile device associated with a primary policyholder. The primary mobile application may be configured to provide services that enable the first mobile device to access primary policyholder insurance information. The processor may also execute instructions to provide a companion mobile application for storage in a second mobile device associated with a secondary policyholder. The companion mobile application may be configured to provide services that enable the second mobile device to access a subset of the primary policyholder insurance information.

In another embodiment, a computer-implemented method for providing mobile applications relating to insurance policies may be provided. The method may include providing an update to the companion mobile application stored in the second mobile device based on one or more changes to the primary policyholder insurance information.

Additional aspects related to the disclosed embodiments will be set forth in part in the description which follows, and in part will be obvious from the description, or may be learned by practice of the disclosed embodiments.

It is to be understood that both the foregoing general description and the following detailed description are exem-

DETAILED DESCRIPTION

Reference will now be made in detail to the disclosed embodiments, certain examples of which are illustrated in the accompanying drawings. One of ordinary skill in the art will recognize that the disclosed embodiments can be modified in various respects, all without departing from the spirit and scope of this disclosure. Accordingly, the drawings and descriptions are to be regarded as illustrative in nature, and not as restrictive. Wherever convenient, the same reference numbers will be used throughout the drawings to refer to the same or like parts.

Methods and systems are disclosed for sharing account information between a primary accountholder's mobile application and one or more secondary accountholder's mobile applications. In one embodiment, a companion mobile application is disclosed that provides a secondary accountholder access to a subset of information relating to the primary accountholder's account. Updates to the primary account are provided to the companion mobile application such that the secondary accountholders have access to current account information without having to provide credentials relating to the primary accountholder. In certain embodiments, updates to the account are transferred from a first mobile device including the primary mobile application to a second mobile device including the companion mobile application.

In certain embodiments, accounts may be any type of account, such as insurance policies (e.g., home, automobile, life, etc.), financial accounts (e.g., credit card accounts, banking accounts, merchant accounts, etc.), or any type of account that is associated with a user.

Figure 1:
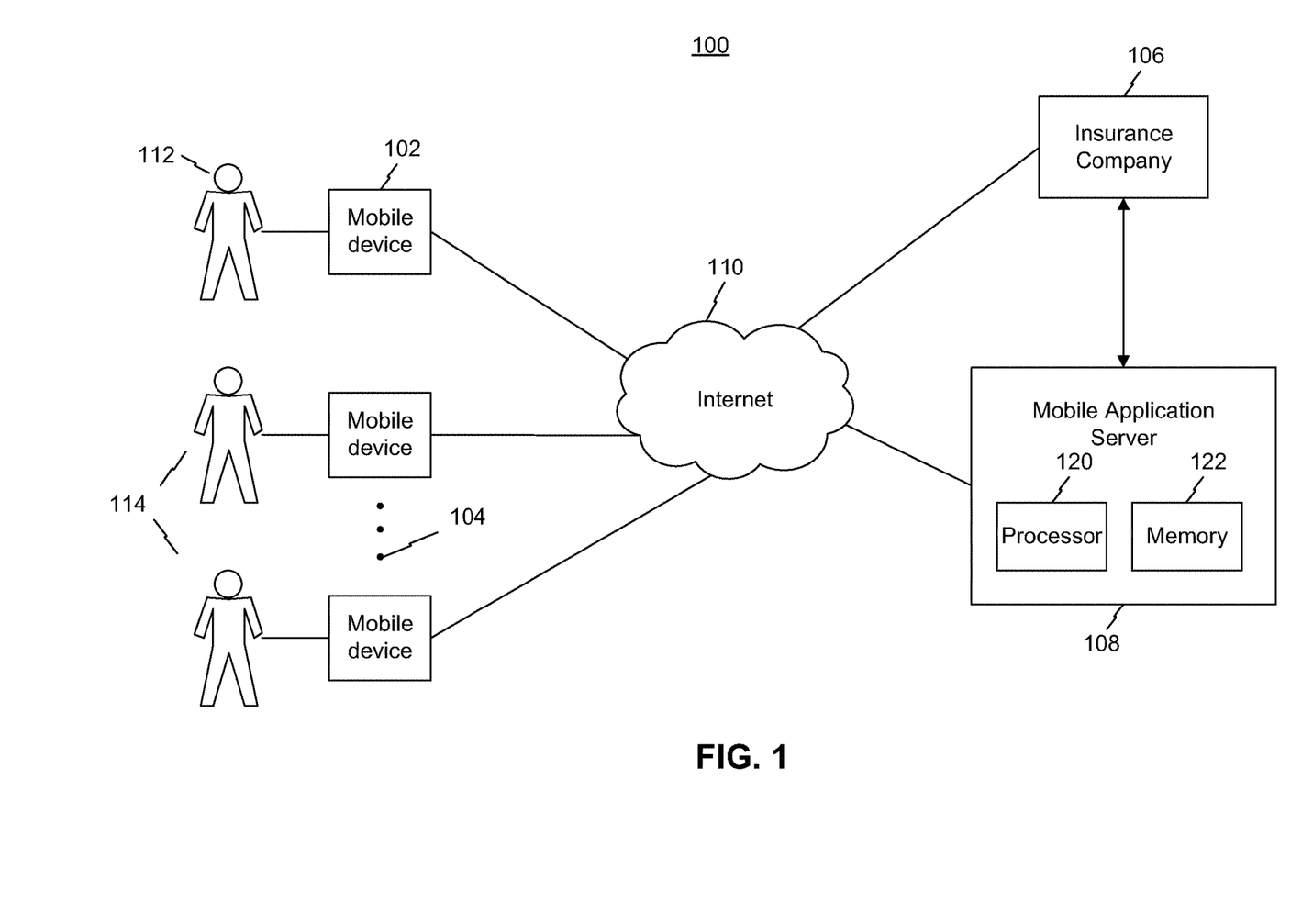
FIG. 1 illustrates an exemplary system for providing access to insurance information, consistent with certain disclosed embodiments.

FIG. 1 illustrates a diagram providing an example of a system 100 for providing access to insurance information, consistent with the disclosed embodiments. Access to other types of information may be contemplated, such as banking, entertainment, or shopping information. System 100 includes, for example, mobile devices 102 and 104, a network, such as the Internet 110, one or more systems relating to an insurance company system 106, and one or more mobile application servers 108. One or more mobile devices 102 may be associated with a primary policyholder 112 and one or more mobile devices 104 may be respectively associated with one or more second policyholders 114. Primary policyholder 112 may be a customer that has an insurance policy with an insurance company relating to insurance company 106. The insurance policy may cover primary policyholder 112 and one or more secondary policyholders 114. The insurance policy may consist of home, automobile, fire, or life insurance, but is not limited to any such embodiment.

Insurance company 106 may be an entity that provides insurance to customers (e.g., policyholders 112, 114). In other embodiments, insurance company system 106 may be another type of company system, such as banking, entertainment, or shopping company system that provides accounts relating to the businesses and services associated with that company. Insurance company 106 may include components, infrastructure, and other elements that enable the insurance company to provide insurance to customers and provide services relating to insurance and insurance policy information. For example, insurance company 106 may include, for example, one or more computer components (e.g., servers, processors, memory devices storing software instructions that when executed by processor(s) execute insurance related processes, communication components, and the like). Insurance company 106 may include systems that are geographically separated (e.g., servers distributed geographically in a locality, county, state, or the United States). Insurance company 106 may reflect a central system (e.g., a central server) that serves other systems (e.g., client computers, other servers, etc.). The configuration and architecture, and the underlying network, hardware, and software components implemented by the components of the one or more systems included in insurance company 106 is not intended to be limiting to the features and processes of the disclosed embodiments.

Primary policyholder 112 may be an individual that is a customer of insurance company 106. Alternatively, primary policyholder 112 may be an entity that is customer of insurance company 106, such as a corporation, partnership, company, government agency, municipality, or other form of business or government entity that maintains insurance for its employees. In other embodiments involving companies other than an insurance company, primary policyholder 112 may be a primary accountholder of that company, such as a primary accountholder of an account provided by a banking company, entertainment company, retail company, and the like.

Primary policyholder 112 may be associated with one or more mobile devices 102 that are configured to be connected to a network, such as Internet 110. In certain embodiments, the network may be any type of communication network configured to transmit information between the components of system 100. For example, the network may include a wireless and/or wireline network components (e.g., hardware, software, and/or firmware) configured to receive, route, translate, and deliver information. For example, the network may include the Internet, an extranet, and Intranet, a Local Area Network, etc. and include infrastructure that implements the communication of information over these types of networks, such as wireless/wireline base stations, transceivers, and related technology. While FIG. 1 illustrates the network as the Internet 110, other types of networks and communication infrastructures may be implemented with the disclosed embodiments.

Secondary policyholders 114 may also be associated with one or more mobile devices 104 connected to the Internet 110. Mobile devices 102 and 104 may consist of smartphones and/or tablets, like the iPhone® or the iPad®, or Blackberry® and Android® type mobile devices. Mobile devices 102 and 104 may be capable of downloading and executing mobile applications. Thus, mobile devices 102 and 104 may be any type of computing device that is capable of providing mobile applications. Mobile devices 102 and 104 may include one or more processors and memory devices storing software instructions that when executed by the mobile device processors perform one or more operations consistent with the disclosed embodiments. Mobile devices 102 and 104 may also include components that provide communications with Internet 110 or other computing components, such as other mobile devices.

In one embodiment, mobile devices 102 and 104 may be connected to one or more mobile application server(s) 108 through a wireless connection to the Internet 110. In other embodiments, mobile devices 102 and 104 may be connected to mobile application server 108 through cloud-based computing. Mobile application server 108 may be one or more computers configured to receive requests for information over a network (e.g., Internet 110) and provide information to components over a network (e.g., Internet 110). For example, in one embodiment, mobile application server 108 may include one or more computer or data processing devices that have hardware (e.g., processors, storage memory, data buses, network interface, etc.) and/or software (e.g., application programs, operating systems, other executable program code written in any known programming languages). In one example, mobile application server 108 may include one or more processors 120 and one or more memory devices (memory 122). Processor 120 may be known processor devices configured to execute software instructions stored on memory device, such as memory 122. Memory 122 may be one or more memory devices configured to store software instructions that when executed by processor 120 perform one or more processes consistent with certain disclosed embodiments.

In one embodiment, mobile application server 108 may be associated with insurance company 106. For example, mobile application server 108 may be associated with a mobile application service provider that provides one or more mobile application for insurance company 106. In another embodiment, mobile application server 108 may be part of insurance company 106.

System 100, or one or more components of system 100, may be configured to execute processes that provide efficient, secure, and user friendly mobile applications relating to insurance policies provided by insurance company 106.

Figure 2:
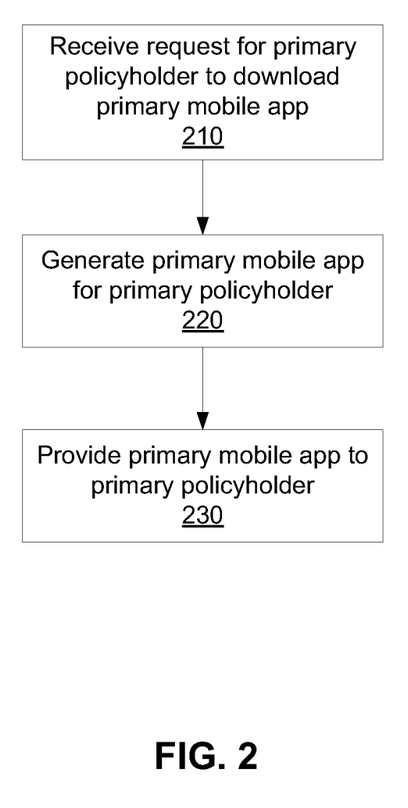
FIG. 2 illustrates a flowchart of an exemplary primary policyholder mobile application generation process, consistent with certain disclosed embodiments.

FIG. 2 illustrates a flowchart of an exemplary primary policyholder mobile application generation process consistent with the disclosed embodiments. In one embodiment, the mobile application generation process may be performed by mobile application server 108. In step 210, mobile application server 108 may receive a request to download a primary mobile application ("app"). For example, primary policyholder 112 may use mobile device 102 to initiate the request, which is communicated to mobile application server 108 over Internet 110.

In response to the request, mobile application server 108 may execute instructions that generate the primary mobile app for primary policyholder 112 (Step 220). In certain embodiments, mobile application server 108 may generate the primary mobile app based on information provided by insurance company 106. In such embodiments, computer components (e.g., processor(s) executing instructions stored on memory device(s)) for insurance company 106 may provide mobile application server 108 with information relating to primary policyholder 112's insurance policy. Primary policyholder 112's insurance policy information may be provided in response to a request from mobile application server 108, or may be automatically provided at determined times, such as when primary policyholder 112 becomes a customer of insurance company 106. Other events may be implemented that trigger the provision of insurance policy information for use by mobile application server 108.

In one embodiment, mobile application server 108 may execute software that performs one or more processes that determine whether primary policyholder 112's insurance policy includes or is affiliated with secondary policyholders, such as children, spouses, other employees, etc. Based on the determination of secondary policyholder(s) 114, mobile application server 108 may generate information that links the primary insurance policy to the secondary insurance policies.

In other embodiments, insurance company 106 may provide options for primary policyholder 112 to control what information relating to the primary insurance policy may be shared with secondary policyholders 114 via the primary mobile app. For example, mobile application server 108 may execute processes that provide options to primary policyholder 102 to select attributes that specify types of information that may be shared with specific secondary policyholders. Thus, in one example, primary policyholder 112 may provide to mobile application server 108 selections that allow a spouse secondary policyholder to have access to certain insurance policy information (e.g., premiums, deductible information, billing information, insurance agent contact data, etc.), and selections that allow a child secondary policyholder to have access to certain insurance policy information (e.g., insurance contact data) but not other information (e.g., billing information). In embodiments where primary policyholder 104 is a business or government entity, such controls can be configured based on employee titles, positions, job descriptions, etc. Thus, the business or government primary policyholder can allow executives to have access to more information about the primary insurance policy than other lower-level employees via mobile applications consistent with the disclosed embodiments.

After the primary mobile app is generated, mobile application server 108 may provide the primary mobile app to mobile device 102 of primary policyholder 112 over a network, such as Internet 110 (Step 230). Mobile device 102 may receive and store the primary mobile app using known processes and mechanisms for downloading and storing mobile applications.

Figure 3:
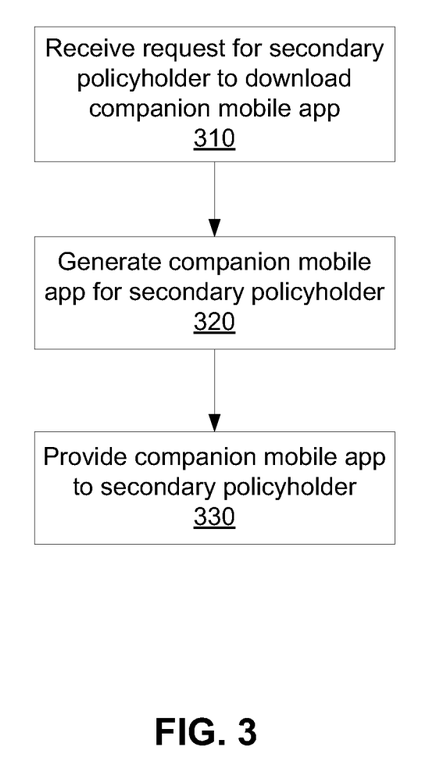
FIG. 3 illustrates a flowchart of an exemplary companion mobile application generation process, consistent with certain disclosed embodiments.

FIG. 3 illustrates a flowchart of an exemplary companion mobile application generation process consistent with the disclosed embodiments. In one embodiment, the companion mobile application generation process may be performed by mobile application server 108. In step 310, mobile application server 108 may receive a request to download a companion mobile application. For example, secondary policyholder 114 may use mobile device 104 to initiate the request, which is communicated to mobile application server 108 over Internet 110.

In response to the request, mobile application server 108 may execute instructions that generate the companion mobile app for primary policyholder 114 (Step 320). In certain embodiments, mobile application server 108 may generate the companion mobile app based on information relating to primary policyholder 112's insurance policy that is provided by insurance company 106 in a manner consistent with that disclosed above. In one embodiment, mobile application server 108 may execute software that performs one or more processes that generates information that is specific to the secondary policyholder requesting the companion mobile application. For example, as disclosed above, embodiments include mechanisms that allow primary policyholder 112 to configure the primary insurance policy's attributes to control what information is provided to specific secondary policyholders via the companion mobile application. Mobile application server 108 may generate the companion mobile application based on this attribute information to ensure that information that primary policyholder 104 does not want secondary policyholder 114 to have access to is not provided via the companion mobile application when used by the secondary policyholder 114. After the companion mobile app is generated, mobile application server 108 may provide the companion mobile application to mobile device 104 of secondary policyholder 114 over a network, such as Internet 110 (Step 330). Mobile device 104 may receive and store the companion mobile app using known processes and mechanisms for downloading and storing mobile applications. In one embodiment, mobile application server 108 may provide the companion mobile application to mobile device 104 through a mobile provider, such as iTunes® or Google Play, using known processes and mechanisms for providing mobile applications. For example, mobile application server 108 may provide companion mobile application (and other mobile applications) to mobile provider application services that enable a user to download the mobile application.

Once the primary and companion mobile applications are stored in mobile devices 102 and 104, respectively, the applications can be used. Primary policyholder 112 may access the primary mobile application by using login credentials, such as a self-created username and password. Other types of login credentials may be used. The primary mobile application may be associated with insurance company 106 and may provide administration, management, assistance, or education features. For example, the primary mobile application may allow primary policyholder 112 to manage his insurance policy, such as making changes to his coverage, adding drivers or vehicles, or paying bills. Other administrative or managerial functions may be provided.

Figure 4:
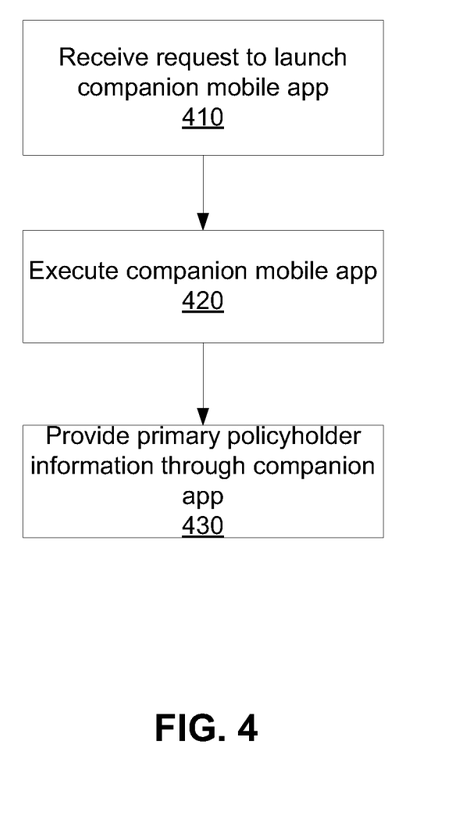
FIG. 4 illustrates a flowchart of an exemplary companion mobile application execution process, consistent with certain disclosed embodiments.

FIG. 4 illustrates a flowchart of an exemplary companion mobile application execution process consistent with disclosed embodiments. In certain embodiments, secondary policyholder 114 may wish to launch the companion app to view information relating to primary policyholder 112's insurance policy information. For example, a secondary policyholder may have to view information on how to report an accident relating to a vehicle covered by the primary insurance policy. To begin, mobile device 104 may execute software instructions that receive a request to launch the companion mobile application stored on mobile device 104 (Step 410). In response to the request, mobile device 104 may execute software that launches the companion mobile app (Step 420). Mobile device 104 may execute the companion mobile app to provide the primary policyholder information via options, interfaces, menus, etc. provided by the companion mobile app (Step 430).

The companion app may provide data that may be used by secondary policyholder 114 in obtaining education services or roadside assistance. For example, the data may include an accident guide with instructions for steps to take after being involved in an accident. Other forms of education services may be provided, such as instructions for changing a flat tire, jump starting a vehicle, checking tire pressure, preparing a vehicle safety kit, reacting to an accident, or handling theft. The data may also include secondary policyholder 114's coverage information for obtaining roadside assistance. For example, the data may include the Vehicle Identification Number, vehicle make, vehicle model, vehicle year, insurance policy number, policy effective date, policy expiration date, insured's address, or insured's phone number. Roadside assistance may include tow providers, gas stations, taxi services, rental cars, or locksmiths. The mobile application on mobile device 104 can therefore access insurance policy information stored on mobile device 104 or on a server of insurance company 106 without primary policyholder 112's account holder credentials. The mobile application on mobile device 104 may execute software to submit a claim or view the status of a claim without primary policyholder 112's credentials.

In certain embodiments, primary policyholder 112 or insurance company 106 may modify the primary policyholder's insurance policy. For example, primary policyholder 112 may update insurance coverage information, pay bills, change attributes that affect the information provided by the companion mobile application, etc. Insurance company 106 may update the primary insurance policy based on recent claims, traffic violations, premium changes, bill payments, etc. Other types of changes to primary policyholder 112's insurance policy are contemplated by the disclosed embodiments. In such instances, the disclosed embodiments provide mechanisms that allow the primary mobile application stored on mobile device 102 and the companion mobile application stored on mobile device 104 to be updated based on primary insurance policy or general insurance company 106 information changes.

Figure 5:
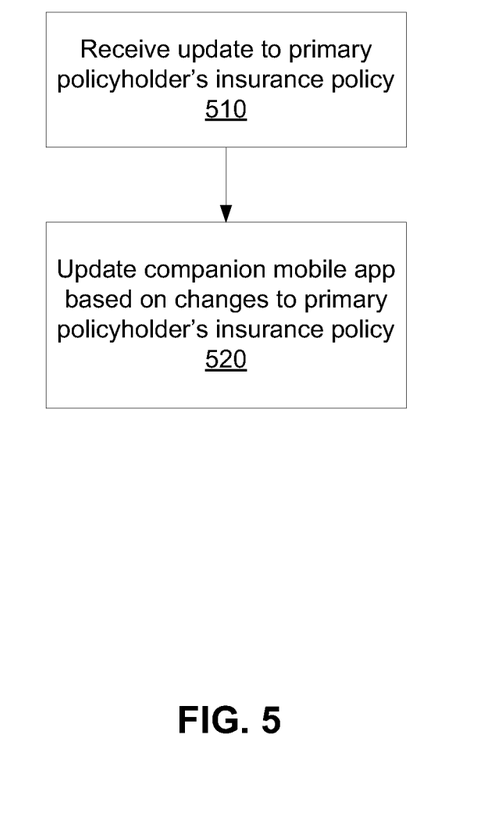
FIG. 5 illustrates a flowchart of an exemplary companion mobile application updating process, consistent with certain disclosed embodiments.

FIG. 5 shows a flowchart of an exemplary companion mobile application updating process consistent with disclosed embodiments. As shown, the companion mobile application updating process may begin by application mobile server 108 receiving an update to primary policyholder 104's insurance policy (Step 510). For instance, insurance company 106 may provide mobile application server 108 with updated primary insurance policy information automatically, periodically, in response to a request by mobile application server 108, in response to an event (e.g., update trigger, request from a user or software executed process), or other mechanisms. For example, primary policyholder 112 may access insurance company 106's website on the Internet 110. Primary policyholder 112 may access the website through a mobile application on mobile device 102 or through an Internet browser on mobile device 102 or a computer. Primary policyholder 112 may enter in log-in credentials to access an account stored in a database on a server of insurance company 106. Primary policyholder 112 may update information stored in the database. For example, primary policyholder 112 may update contact information associated with his insurance policy with insurance company 106 or may make changes to his insurance coverage. Other mechanisms for updating information in the server of insurance company 106 may be implemented. For example, in one embodiment, primary policyholder 112 may request a change to his information via a telephone communication with an agent of insurance company 106, and the agent may make changes in the server. In other embodiments, insurance company 106 may initiate changes to primary policyholder 112's information.

Mobile application server 108 may update the data provided to primary policyholder 112's and secondary policyholder 114's mobile applications, respectively. For example, insurance company 106 may change certain aspects of primary policyholder 112's insurance policy. These changes may be reflected in the mobile applications of primary policyholder 112 and/or secondary policyholder 114. In one embodiment, primary policyholder 112 may request the changes to his insurance policy. In other embodiments, insurance company 106 may change aspects of the insurance policy independently.

Mobile application server 108 may update the companion mobile app based on changes to primary policyholder 112's insurance policy (Step 520). Mobile application server 108 may update companion mobile application based on updates to other information relating to the insurance policy, including information relating to general insurance company 106 data. Mobile application server 108 may propagate the updated information to the mobile applications on mobile devices 102 and 104. As explained, in one embodiment, mobile application server 108 may propagate the information automatically. In other embodiments, mobile application server 108 may propagate the information in response to receiving a prompt from primary policyholder 112 or secondary policyholder 114. The prompt may consist of either primary policyholder 112 or secondary policyholder 114 logging into an account on a website of insurance company 106. Secondary policyholder 114 may have a separate account from primary policyholder 112 with separate log-in credentials to access the account. Upon entering in valid log-in credentials to access the account, mobile application server 108 may update the information on the mobile device associated with the account holder. The prompt may also consist of primary policyholder 112 or secondary policyholder 114 logging into the mobile application on mobile devices 102 and 104, respectively. The mobile application on mobile device 104 can therefore received updated insurance policy information stored on a server of insurance company 106 without primary policyholder 112's account holder credentials.

In certain embodiments, mobile application server 108 may automatically update the companion mobile application on mobile device 104 through known uploading or push technologies. Mobile device 104 may execute software that receives the updates from mobile application server 108 and updates the companion mobile application data accordingly. In other embodiments, the companion mobile application on mobile device 104 may be updated through mechanisms initiated through the primary policyholder 112's mobile device 102.

Figure 6:
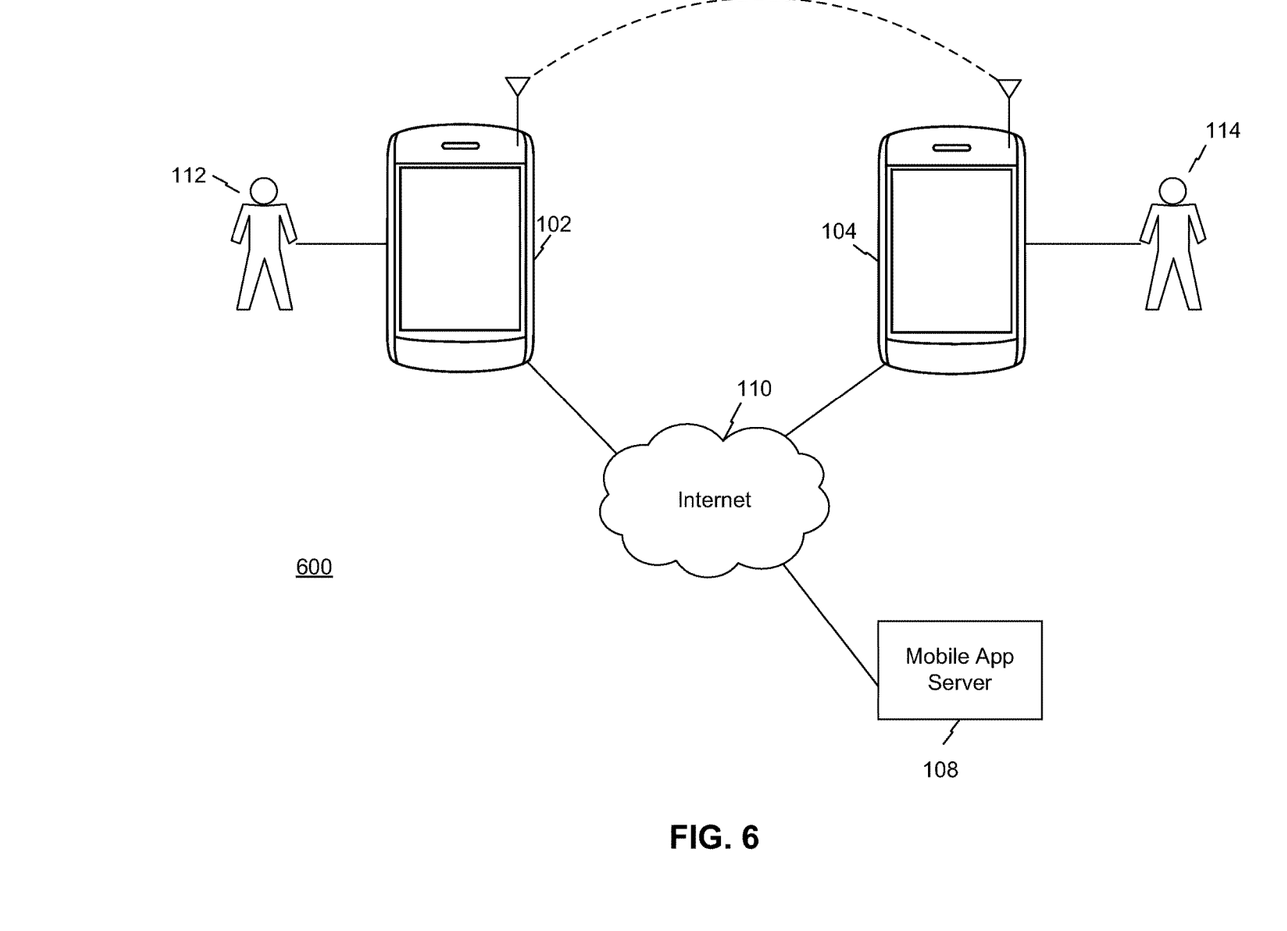
FIG. 6 illustrates an exemplary system for updating the companion mobile application of a secondary policyholder's mobile device, consistent with certain disclosed embodiments.

FIG. 6 illustrates an exemplary diagram of a system 600 for updating the companion mobile application of a secondary policyholder's mobile device, consistent with the disclosed embodiments. In system 600, when updates are made to primary policyholder 112's insurance policy, mobile application server 108 may update the information stored on the primary mobile application of mobile device 102 via the Internet 110. At some point, secondary policyholder 114 may be notified that the primary policyholder 112's insurance policy information has been updated. For example, secondary policyholder 114 may receive an email, text, etc. at mobile device 104 or a computer that indicates that information has been updated. Secondary policyholder 114 may also be informed of the updates by primary policyholder 102, or by a representative of insurance company 106. Secondary policyholder 114 may then choose to update its companion mobile application on mobile device 104 through a proximity wireless protocol mechanism, such as Bluetooth. Alternatively, primary policyholder 114 may initiate the update of the companion mobile application on mobile device 104. In either case, using the wireless protocol mechanism provided by the devices 102 and 104, primary policyholder 112's mobile device 102 transfers data relating to the primary policyholder's insurance policy stored in the primary mobile application to secondary policyholder 114's companion mobile application on mobile device 104. To protect the security of the transferred information, mobile device 102 and mobile device 104 may need to undergo pairing to confirm the identity of the devices. Such pairing techniques would be known to a person of ordinary skill in the art. In certain aspects of the disclosed embodiments, mobile device 102 may be configured to execute software processes (e.g., primary mobile application) that interfaces and implements the wireless protocol communication mechanism such that only updated information is provided to secondary policyholder 114's mobile device 104 for updating the companion mobile application stored on device 104.

Figure 7:
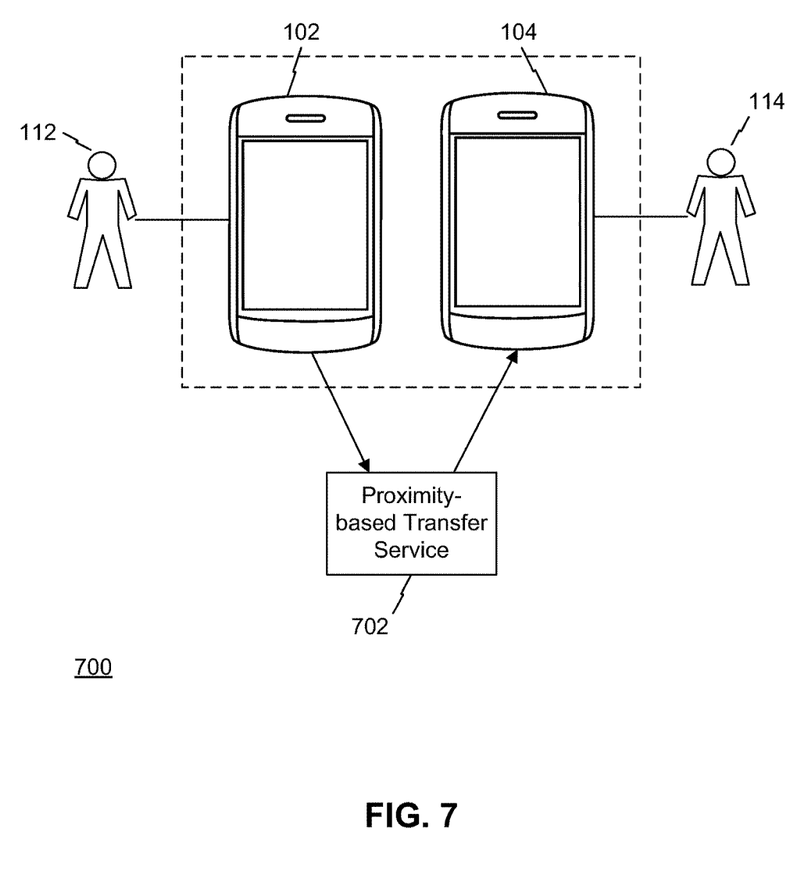
FIG. 7 illustrates another exemplary system for updating the companion mobile application of a secondary policyholder's mobile device, consistent with certain disclosed embodiments.

Other mechanisms may be implemented to update the companion mobile application of the secondary policyholder 114's mobile device 104. For example, FIG. 7 illustrates an exemplary diagram of another system 700 for updating the companion mobile application of a secondary policyholder's mobile device, consistent with the disclosed embodiments. In system 700, primary policyholder 112's mobile device 102 communications with secondary policyholder 114's mobile device 104 via a proximity-based application program interface, such as Bump™ or Near Field Communication (NFC). In one embodiment, a proximity data transfer service 702 may be used to make the proximity-based transfer of data. In this embodiment, primary policyholder 112's mobile device 102 initiates the transfer of data stored on its mobile application to service 702, and secondary policyholder 114's mobile device 104 invokes service 702. Service 702 determines whether mobile device 104 is within a permitted proximity to mobile device 102, and if so, transfers the data to the mobile application on mobile device 104. When updates are made to primary policyholder 112's insurance policy, primary policyholder 112 may invoke service 702 to update the information stored on the mobile application of secondary policyholder 114's mobile device 104. Such proximity data transfer techniques (e.g., Bump, NFC, and similar mechanisms) would be known to a person of ordinary skill in the art.

Figure 8:
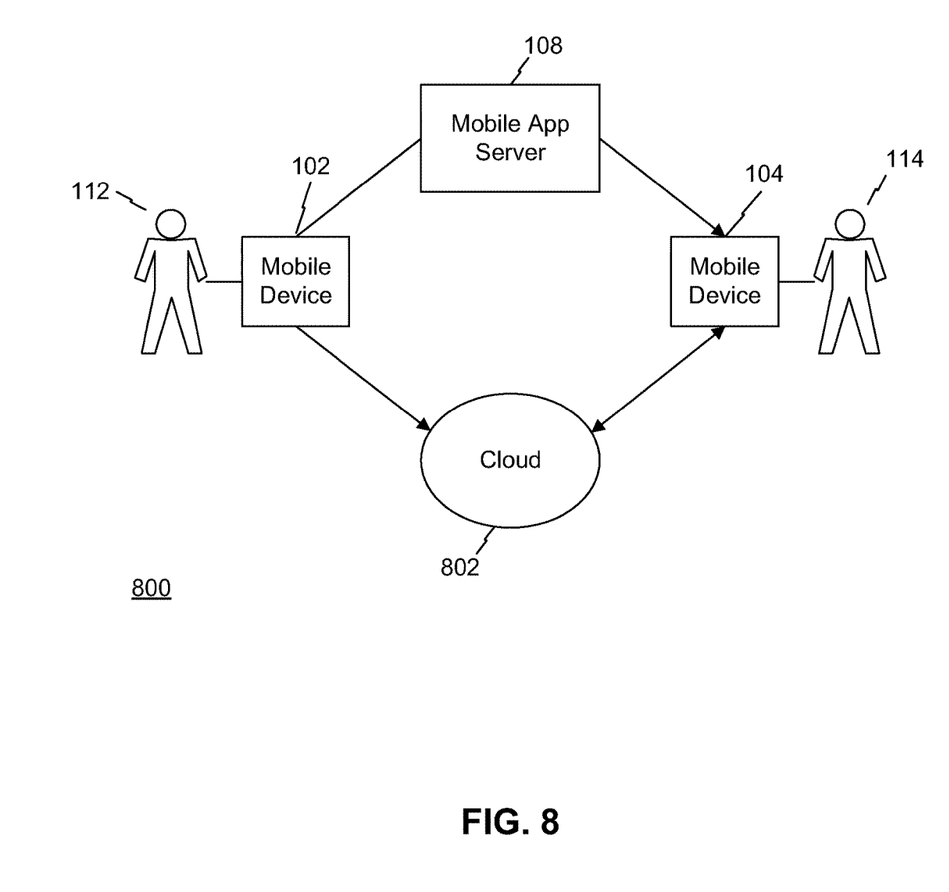
FIG. 8 illustrates another exemplary system for updating the companion mobile application of a secondary policyholder's mobile device, consistent with certain disclosed embodiments.

FIG. 8 illustrates another exemplary system 800 for updating the companion mobile application of a secondary policyholder's mobile device 104, consistent with the disclosed embodiments. In system 800, primary policyholder 112's mobile device 102 may be configured to execute software processes that (upon user request or based on determined events) transmit information relating to mobile device 102's primary mobile application to one or more computers (e.g., servers) implemented in a cloud-based network 802. Cloud-based network 802 may include one or more servers or other computer systems and data storage devices that enable cloud-based computing known to those skilled in the art. In one embodiment, cloud-based network 802 may be provided by insurance company 106. In another embodiment, cloud-based network 802 may be associated with mobile application server 108 (e.g., may be part of the same computing network, components, etc.). In one embodiment, mobile application server 108 (and/or cloud-based network 802) may provide secondary policyholder 114 (via a computer or mobile device 104) with a token password that is used to access the information stored on cloud-based network 802. Mobile device 104 may be configured to execute processes that access cloud-based network 802, including synchronization and handshaking processes known in the art. Mobile device 104 may retrieve the updated insurance policy information stored in a server of cloud-based network 802 to update the companion mobile application stored on mobile device 104. Thus, in certain examples, when updates are made to primary policyholder 112's insurance policy, secondary policyholder 114 may access cloud-based network 802 (via a computer or mobile device 104) to update the companion mobile application of secondary policyholder 114's mobile device 104.

The above-described devices and subsystems of disclosed embodiments can include, for example, any suitable servers, workstations, PCs, laptop computers, PDAs, Internet appliances, handheld devices, cellular telephones, wireless devices, or other devices capable of performing the processes of the exemplary embodiments.

All or a portion of the devices and subsystems of the exemplary embodiments may be implemented using one or more general purpose computer systems, microprocessors, digital signal processors, micro-controllers, and the like, programmed according to the teachings of exemplary embodiments, as will be appreciated by those of ordinary skill in the computer and software arts. To implement such an embodiment as well as other embodiments, a single computer system may be programmed to perform the special purpose functions of one or more of the devices and subsystems of the disclosed embodiments. On the other hand, two or more programmed computer systems or devices may be substituted for any one of the devices and subsystems of the exemplary embodiments. Accordingly, principles and advantages of distributed processing, such as redundancy, replication, and the like, increase the robustness and performance of the devices and subsystems of the exemplary embodiments.

The devices and subsystems of the exemplary embodiments can communicate with each other using any suitable protocol and can be implemented using one or more programmed computer systems or devices that are consistent with the disclosed embodiments. One or more communication mechanisms may be used with disclosed embodiments, including, but not limited to, Internet access, telecommunications in any suitable form (e.g., voice, modem, and the like), and wireless communications media, and the like. For example, employed communications networks or links can include one or more wireless communications networks, cellular communications networks, 3G, 4G, etc. type communications networks, Public Switched Telephone Network (PSTNs), Packet Data Networks (PDNs), the Internet, intranets, or a combination thereof.

Appropriate software may be prepared by programmers of ordinary skill based on the teachings of the exemplary embodiments. Further, the devices and subsystems of the exemplary embodiments can be implemented on the World Wide Web. In addition, the devices and subsystems of exemplary embodiments may be implemented by the preparation of application-specific integrated circuits or by interconnecting an appropriate network of conventional component circuits, as will be appreciated by those skilled in the electrical art. Thus, the exemplary embodiments are not limited to any specific combination of hardware circuitry and/or software.

Stored on any one or on a combination of solid, tangible computer readable media, disclosed embodiments may include instructions programmed according to the disclosed teachings for controlling the devices and subsystems of embodiments, for driving the devices and subsystems of embodiments, and for enabling the devices and subsystems of embodiments to interact with a user. Such software may include, but is not limited to, device drivers, firmware, operating systems, development tools, applications software, and the like. Software implementing exemplary embodiments may include any suitable interpretable or executable code mechanism, including but not limited to scripts, interpretable programs, dynamic link libraries (DLLs), Java classes and applets, complete executable programs, and Common Object Request Broker Architecture (CORBA) objects implemented using a variety of programming languages, such as Java, C, C++, JavaScript, or any other now known or later created programming language. Moreover, parts of the processing of the exemplary embodiments can be distributed for better performance, reliability, and cost. The described implementation includes software, but the disclosed embodiments may be implemented as a combination of hardware and software.

In addition to the stored instructions programmed according to the disclosed teachings devices and systems of disclosed embodiments may include computer readable media for storing information relating to various processes described herein using data structures, tables, records, and/or other data described herein. Computer readable media can include any suitable medium that participates in providing instructions to a processor for execution. Such a medium may take many forms, including but not limited to, non-volatile media, volatile media, and the like. Non-volatile media can include, for example, hard disks, solid-state devices, optical or magnetic disks, magneto-optical disks, floppy disks, CD-ROM and the like. Volatile media can include dynamic memories, and the like. Common forms of computer-readable media can include, for example, a floppy disk, a flexible disk, hard disk, solid-state devices, magnetic tape, any other suitable magnetic medium, a CD-ROM, CDRW, DVD, SD cards, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, or any other suitable medium from which a computer or processor can read and execute.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, while the disclosed embodiments describe aspects that allow secondary policyholders to implement companion mobile applications, other embodiments may be implemented that enable third parties to use companion mobile applications on mobile devices that enable access to information relating to the primary policyholder's insurance policy information in a manner consistent with the disclosed embodiments. For example, insurance company 106 and/or mobile application server 108 may be configured to allow primary policyholder 112 to enable non policy holders (e.g., secondary policyholders) to have access to selected information relating to the primary insurance company. As such, in addition to secondary policyholders 114, the disclosed embodiments may implement features where other types of entities or individuals can download and execute a companion mobile application in a manner consistent with that disclosed herein.

In another embodiment, the primary mobile application provided by the disclosed embodiments may be configured to perform processes, when executed by a processor (e.g., such as a processor in mobile device 102), that determine what insurance policy information to send directly to a secondary policyholder 114's mobile device 104 when updating the companion mobile application through direct wireless (e.g., Bluetooth) technologies. In such embodiments, the primary mobile application may perform one or more processes that determine the identity of the mobile device 104 (e.g., phone number, ID number, etc.) when establishing a communication session between mobile device 102 and mobile device 104. The primary mobile application processes may determine the identity of the secondary policyholder 114 based on the identity of mobile device 104 based on a table, list, etc. of secondary policyholders relating to the primary policyholder's insurance policy. Other types of mechanisms can be implemented to determine the identity of the secondary policyholder 114 or the mobile device 104 communicating with mobile device 102 and the primary mobile application. Based on those determinations, the primary mobile application may determine what subset of insurance policy information should be transferred to mobile device 104 to update the companion mobile application stored and executed by mobile device 104. The subset of insurance policy information communicated may be determined based one or more rules associated with the identity of the secondary policyholder (e.g., a spouse policyholder receives more information than a child policyholder, etc.).

Figure 9:
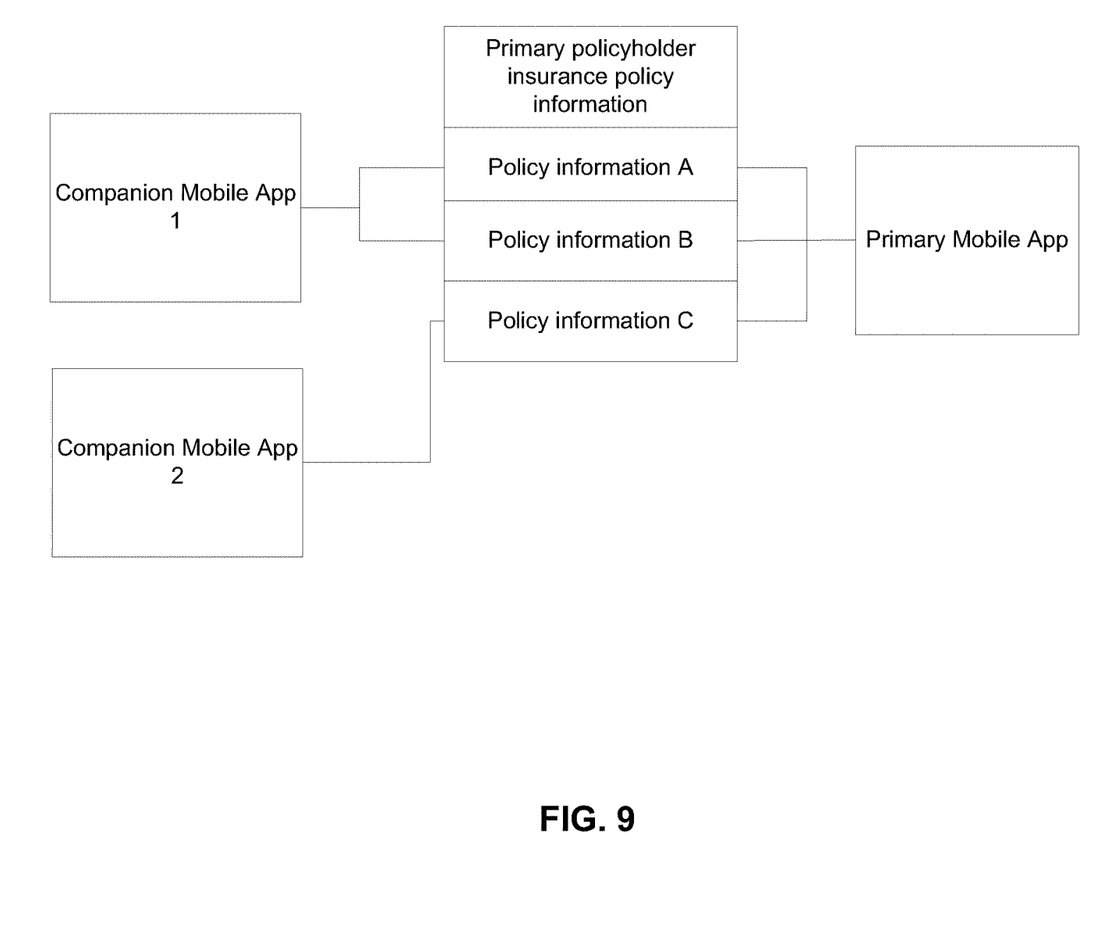
FIG. 9 illustrates a diagram of an exemplary relationship between companion mobile applications and a primary mobile application, consistent with certain disclosed embodiments.

In certain embodiments, the companion mobile applications stored and executed on mobile device(s) 104 may be linked to the primary mobile application stored and executed on mobile device 102 through the information relating to the primary policyholder's insurance policy. FIG. 9 shows a block diagram illustrating an exemplary relationship between companion mobile applications and a primary mobile application, consistent with certain embodiments. As shown, a primary mobile application may have access to, and store information for, a primary policyholder's insurance policy (e.g., policy information A, B, and C). Companion mobile application 1 may be associated with a first secondary policyholder 114 that only has access to, and stores, policy information A and B. Companion mobile application 2 may be associated with a second secondary policyholder 114 that only has access to, and stores, policy information C. As the policy information is updated, the access to the information may change based on controls set by primary policyholder 112 via insurance company 106, mobile application server 108, and/or the primary mobile application. New policy information may be added, some information may be deleted, or data within the policy information may be updated.

It is intended that the specification and examples be considered as exemplary only, with the true scope and spirit being indicated by the following claims. Access of the disclosed invention by the secondary accountholder to the primary accountholder information may also include specific authority over the primary account. For example, in certain embodiments, the companion application may be configured such that it allows the secondary accountholder to access and edit primary account information, such as changing the date of a transfer of funds (e.g., for a banking account), adding a movie to a queue (e.g., for an entertainment account), or putting an item in an online shopping cart (e.g., for a shopping account). Other embodiments may be contemplated within the scope of the disclosed invention.

The invention claimed is:

1. A mobile device for accessing information relating to a primary insurance policy of a primary policyholder, comprising:
a memory storing instructions; and
a processor for executing the instructions, the processor configured to:
provide, to a server via a companion mobile application, authentication credentials relating to a secondary account associated with a secondary policyholder for the primary insurance policy,
receive, from the server via the companion mobile application, access to a subset of the primary insurance policy information in response to a validation of the authentication credentials, wherein the subset of the primary policy information is defined by option information provided by a remote device via a primary mobile application associated with a primary accountholder for the primary insurance policy, wherein the option information comprises a first set of attributes specifying one or more types of information in the subset of the primary insurance policy information accessible to the secondary account, and wherein the companion mobile application is different from the primary mobile application, and
update the subset of the primary policy information based on at least one change to the primary insurance policy information for the primary policyholder.

2. The mobile device of claim 1, wherein the processor is further configured to update the subset of the primary policy information by receiving the at least one change to the primary insurance policy information from a mobile application server.

3. The mobile device of claim 2, wherein the at least one change to the primary insurance policy is made by at least one of the primary policyholder or an insurance company that provides the primary insurance policy.

4. The mobile device of claim 1, wherein the processor is further configured to update the subset of the primary policy information by receiving the at least one change to the primary insurance policy information from the remote device.

5. The mobile device of claim 4, wherein the processor is further configured to update the subset of the primary policy information by receiving the at least one change to the primary insurance policy information from the remote device through a proximity data transfer interface.

6. The mobile device of claim 1, wherein the primary mobile application is installed on the remote device, and wherein the at least one change to the primary insurance policy information is submitted from the primary mobile application on the remote device.

7. The mobile device of claim 1, wherein the processor is further configured to update the subset of the primary policy information by receiving the at least one change to the primary insurance policy information from a cloud-based network.

8. The mobile device of claim 1, wherein the processor is further configured to update the subset of the primary policy information by receiving the at least one change to the primary insurance policy information through a direct wireless communication with the remote device.

9. The mobile device of claim 1, wherein the processor is further configured to provide access to the subset of the primary insurance policy information without requiring credentials relating to the primary policyholder.

10. The mobile device of claim 1, wherein the processor is further configured to prevent access to primary insurance policy information that is not included in the subset of the primary policy information.

11. A computer-implemented method for accessing information relating to a primary insurance policy of a primary policyholder, the method comprising the following operations performed by one or more processors:
providing, via a companion mobile application, authentication credentials relating to a secondary account associated with a secondary policyholder for the primary insurance policy;
receiving via the companion mobile application, access to a subset of the primary insurance policy information in response to a validation of the authentication credentials, wherein the subset of the primary insurance policy information is defined by option information provided by a remote device via a primary mobile application associated with a primary accountholder for the primary insurance policy, wherein the option information comprises a first set of attributes specifying one or more types of information in the subset of the primary insurance policy information accessible to the secondary account and wherein the companion mobile application is different from the primary mobile application; and
updating the subset of the primary policy information based on at least one change to the primary insurance policy information for the primary policyholder.

12. The computer-implemented method of claim 11, further comprising:
receiving the at least one change to the primary insurance policy information from a mobile application server.

13. The computer-implemented method of claim 11, further comprising:
receiving the at least one change to the primary insurance policy information from the remote device.

14. The computer-implemented method of claim 11, wherein the primary mobile application is installed on the remote device, and wherein the at least one change to the primary insurance policy information is submitted from the primary mobile application on the remote device.

15. The computer-implemented method of claim 13, further comprising:
receiving the at least one change to the primary insurance policy information from the remote device through a proximity data transfer interface.

16. The computer-implemented method of claim 11, further comprising:
receiving the at least one change to the primary insurance policy information from a cloud-based network.

17. The computer-implemented method of claim 11, further comprising:
receiving the at least one change to the primary insurance policy information through a direct wireless communication with the remote device.

18. The computer-implemented method of claim 11, wherein the at least one change to the primary insurance policy is made by at least one of the primary policy holder or an insurance company that provides the primary insurance policy.

19. The computer-implemented method of claim 11, further comprising:
providing, by the processor, the access to the subset of the primary insurance policy information without requiring credentials relating to the primary policyholder.

20. The computer-implemented method of claim 14, further comprising:
providing access to a limited set of primary insurance policy information that is different from the primary insurance policy information that is accessible by the primary mobile application executed by the remote device.

21. A system for providing mobile applications relating to insurance policies, comprising:
a memory device including program instructions; and
a processor configured to execute the program instructions to:
provide, via a primary mobile application, a first mobile device associated with a primary policyholder of a primary account provided by an insurance company access to primary policyholder insurance information;
determine whether the primary account is affiliated with a secondary account, the secondary account associated with a secondary policyholder of the primary account;
receive, via the primary mobile application, option information from the primary account, the option information defining a subset of the primary policyholder insurance information available to the secondary account, wherein the option information comprises a first set of attributes specifying one or more types of information in the subset of the primary insurance policy information;
receive authentication credentials from a second mobile device associated with the secondary account via a companion mobile application different from the primary mobile application;
validate the authentication credentials;
provide the second mobile device access to the subset of the primary policyholder insurance information via the companion mobile application in response to the validation of the authentication credentials; and
provide an update to the subset of the primary policyholder insurance information stored in the second mobile device based on one or more changes to the primary policyholder insurance information.

22. The system of claim 21, wherein the processor is further configured to execute the program instructions to:
receive a request to update the subset of the primary policyholder insurance information from at least one of the first mobile device or second mobile device.

23. The system of claim 21, wherein the processor is further configured to execute the program instructions to:
receive the primary policyholder insurance information from a remote server.

24. The system of claim 21, wherein the processor is further configured to execute the program instructions to:
receive the one or more changes to the primary policyholder insurance information from the first mobile device.

25. The system of claim 24, wherein the processor is further configured to provide the second mobile device access to the subset of the primary policyholder insurance information without requiring credentials relating to the primary policyholder.

26. The system of claim 21, wherein the processor is further configured to execute the program instructions to:
receive the one or more changes to the primary policyholder insurance information from a remote server associated with the insurance company.

27. The system of claim 21, wherein the one or more changes to the primary policyholder insurance information is made by at least one of a primary policyholder or the insurance company that provides the primary insurance policy.

28. The computer-implemented method of claim 11, wherein the option information further comprises a second set of attributes specifying one or more types of information in the primary insurance policy information accessible by a second secondary account, wherein the second set of attributes is different from the first set of attributes.

29. A computer-implemented method for providing mobile applications relating to insurance policies, comprising the following operations performed by one or more processors:
providing, via a primary mobile application, a first mobile device associated with a primary policyholder of a primary account provided by an insurance company access to primary policyholder insurance information;
determining whether the primary account is affiliated with a secondary account, the secondary account associated with a secondary policyholder of the primary account;
receiving, via the primary mobile application, option information from the primary account, the option information defining a subset of the primary policyholder insurance information available to the secondary account, wherein the option information comprises a first set of attributes specifying one or more types of information in the subset of the primary insurance policy information accessible to the secondary account;
receiving authentication credentials from a second mobile device associated with the secondary account via a companion mobile application different from the primary mobile application;
validating the authentication credentials;
providing the second mobile device access to the subset of the primary policyholder insurance information via the companion mobile application in response to the validation of the authentication credentials; and
providing an update to the subset of the primary policyholder insurance information stored in the second mobile device based on one or more changes to the primary policyholder insurance information.

30. The method of claim 29, further comprising:
receiving the one or more changes to the primary policyholder insurance information from the first mobile device.

31. The method of claim 29, further comprising:
receiving the one or more changes to the primary policyholder insurance information from a server associated with the insurance company.

32. A mobile device for accessing information relating to a primary account of a primary accountholder, comprising:
a memory storing instructions; and
a processor for executing the instructions, the processor configured to:
provide, to a server via a companion mobile application, authentication credentials relating to a secondary account associated with a secondary policyholder for the primary account, and
receive, from the server via the companion mobile application, access to a subset of the primary account information in response to a validation of the authentication credentials, wherein the subset of the primary account information is defined by option information provided by a remote device via a primary mobile application associated with a primary accountholder for the primary account, wherein the option information comprises a first set of attributes specifying one or more types of information in the subset of the primary account information accessible to the secondary account, and wherein the companion mobile application is different from the primary mobile application; and
update the subset of the primary account information based on at least one change to the primary account information for the primary accountholder.

33. A computer-implemented method accessing information relating to a primary account of a primary accountholder, comprising:
providing, by a processor executing a companion mobile application, authentication credentials relating to a secondary account associated with a secondary accountholder of the primary account; and
receiving, by the processor, access to a subset of the primary account information in response to a validation of the authentication credentials, wherein the subset of the primary account information is defined by option information provided by a remote device via a primary mobile application associated with the primary account, wherein the option information comprises a first set of attributes specifying one or more types of information in the subset of the primary account information accessible to the secondary account, and wherein the companion mobile application is different from the primary mobile application; and
updating the subset of the primary account information based on at least one change to the primary account information for the primary accountholder.

34. A system for providing mobile applications relating to accounts, comprising:
a memory device including program instructions; and
one or more processors configured to execute the program instructions to:
provide, via a primary mobile application, a first mobile device associated with a primary accountholder access to primary account information associated with a primary account;
determine whether the primary account is affiliated with a secondary account, the secondary account associated with a secondary accountholder of the primary account;
receive, via the primary mobile application, option information from the primary account, the option information defining a subset of the primary account information available to the secondary account, wherein the option information comprises a first set of attributes specifying one or more types of information in the subset of the primary account information;
receive authentication credentials from a second mobile device associated with the secondary account via a companion mobile application different from the primary mobile application;
validate the authentication credentials;
provide the second mobile device access to the subset of the primary account information via the companion mobile application in response to the validation of the authentication credentials; and provide an update to the subset of the primary account information stored in the second mobile device based on one or more changes to the primary account information.

35. A computer-implemented method for providing mobile applications relating to primary accounts, comprising:

providing, via a primary mobile application, a first mobile device associated with a primary accountholder of a primary account access to primary account information;

determining whether the primary account is affiliated with a secondary account, the secondary account associated with a secondary policyholder of the primary account;

receiving, via the primary mobile application, option information from the primary account, the option information defining a subset of the primary account information available to the secondary account, wherein the option information comprises a first set of attributes specifying types of information accessible in the subset of the primary account information;

receiving authentication credentials from a second mobile device associated with the secondary account via a companion mobile application different from the primary mobile application;

validating the authentication credentials;

providing the second mobile device access to the subset of the primary account information via the companion mobile application in response to the validation of the authentication credentials; and providing an update to the subset of the primary account information stored in the second mobile device based on one or more changes to the primary account information.

36. The mobile device of claim 1, wherein the option information further comprises a second set of attributes specifying one or more types of information in the primary insurance policy information accessible by a second secondary account, wherein the second set of attributes is different from the first set of attributes.

* * * * *